Figure 1:
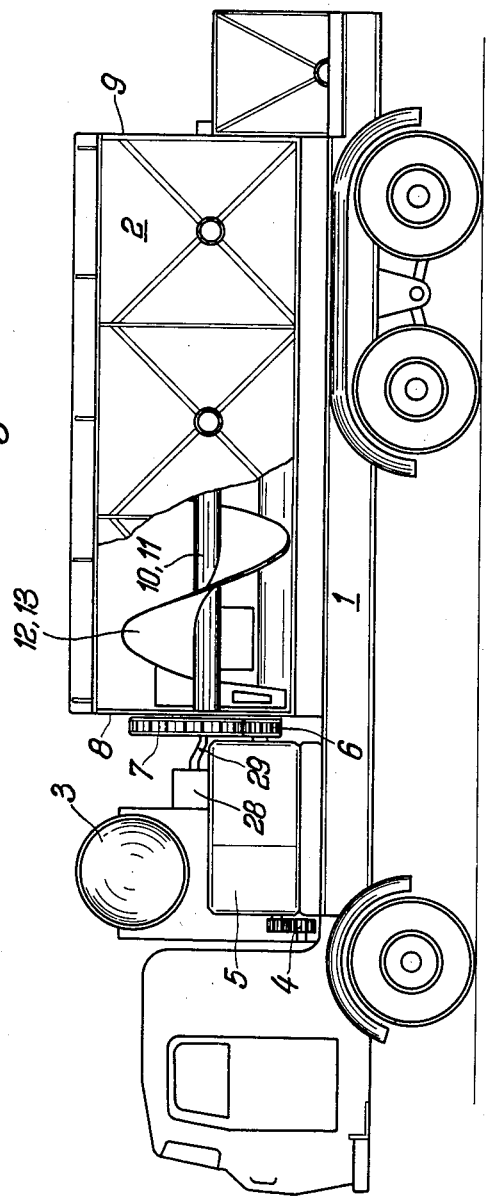

March 24, 1964 G. H. MAURER ETAL 3,126,197
TRANSPORT MIXER FOR CONCRETE AND OTHER BUILDING MATERIAL
Filed Dec. 30, 1960 5 Sheets-Sheet 2

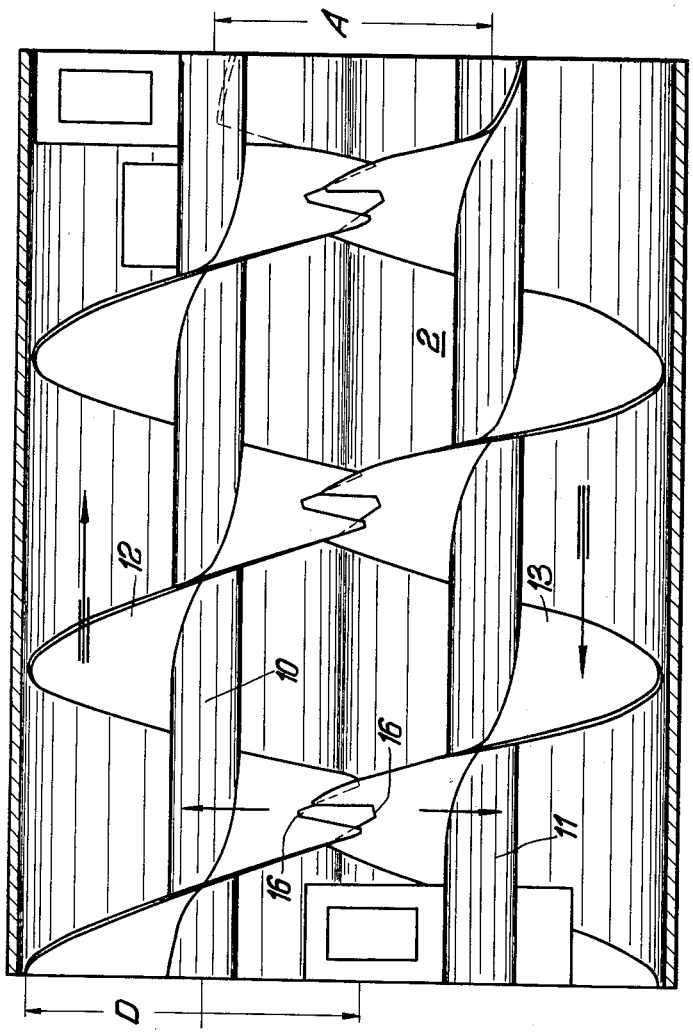

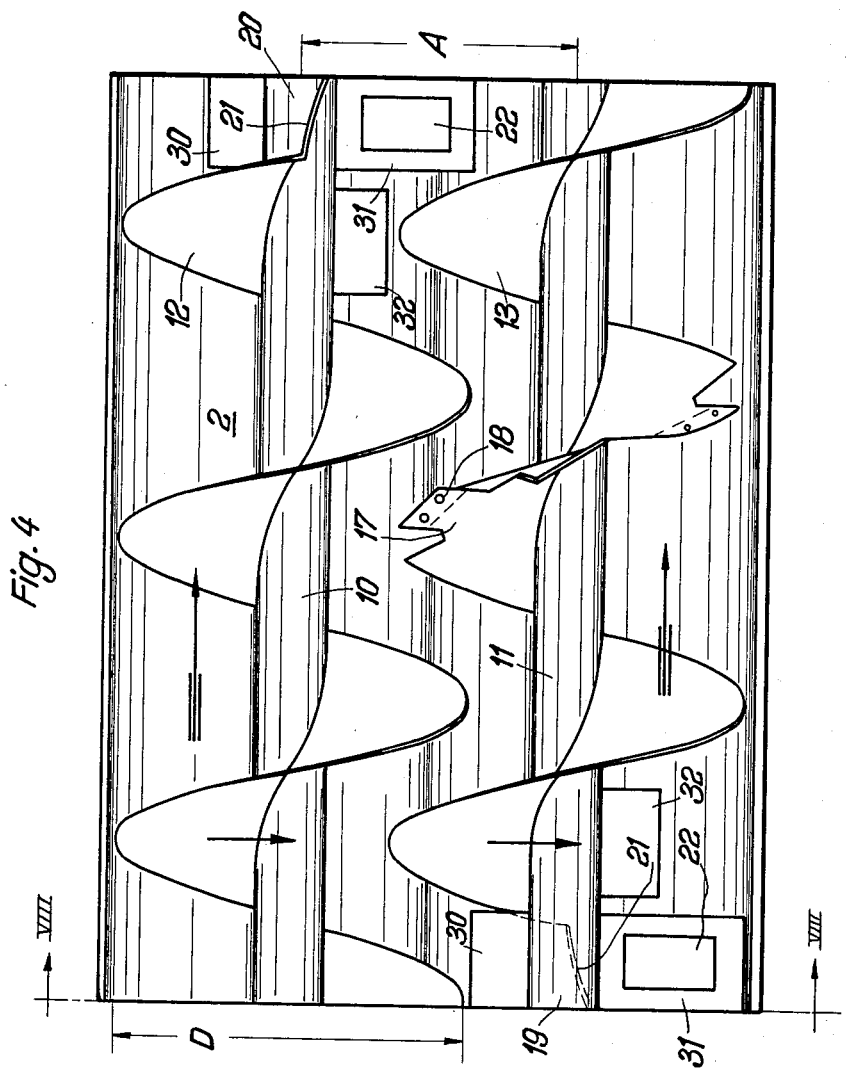

United States Patent Office 3,126,197
Patented Mar. 24, 1964

3,126,197
TRANSPORT MIXER FOR CONCRETE AND
OTHER BUILDING MATERIAL
Gisela H. Maurer and Maximilian Brandmeier, both of Hannover, and Gerhard Kurt Lichtner, Berlin-Spandau, Germany, assignors to Marg Maschinenbau G.m.b.H., Hannover, Germany
Filed Dec. 30, 1960, Ser. No. 79,867
Claims priority, application Germany Dec. 30, 1959
10 Claims. (Cl. 259—161)

This invention relates to a transport mixer for concrete and other building materials having a mixing trough which is open at its upper end and which has an outlet closing device at its rear end and having a mixing screw with a pitch of less than 45° arranged on a shaft which extends in longitudinal direction of the mixer.

The object of the present invention is to produce a transport mixer of the type indicated which allows of a maximum economy of space and at the same time makes it possible to produce mechanically mixed concrete, mortar and the like.

This object is achieved according to the present invention by providing two parallel mixing screws at a distance from each other which is less than the diameter of the screws and by making incisions on the periphery of said elements so that the elements can engage with one another at their periphery.

The construction of the transport mixer according to the invention makes it possible to use a substantially rectangular tank and to achieve a maximum transport volume by observance of the prescribed dimensions.

In a preferred embodiment the screw which brings the mix away from the outlet opening at the rear end, is reversible in its direction of rotation. In this way the tank can be quickly and completely emptied. Moreover, means are provided in the gear mechanism of the screws which do not allow reversal direction of movement of the screw to take place until both screws are in the same position with reference to their pitch.

To improved the circulation of the material to be mixed the screws are provided with a section situated at their front end, looking in the direction of advance, and lying close to the tank wall, which section has a pitch greater than 45° and thus effects a lateral advance of the mix towards the neighbouring element. This section can be provided with an overflow opening.

To improve the discharge capacity of the reversible screw, it can be given a pitch which is less steep over a limited length at its end near the outlet opening.

The invention is illustrated by way of example in the drawings and described below in detail with reference to the drawings.

Figure 2:
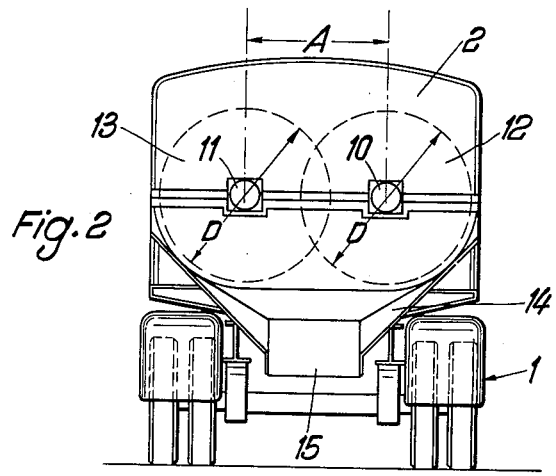
Figure 8:
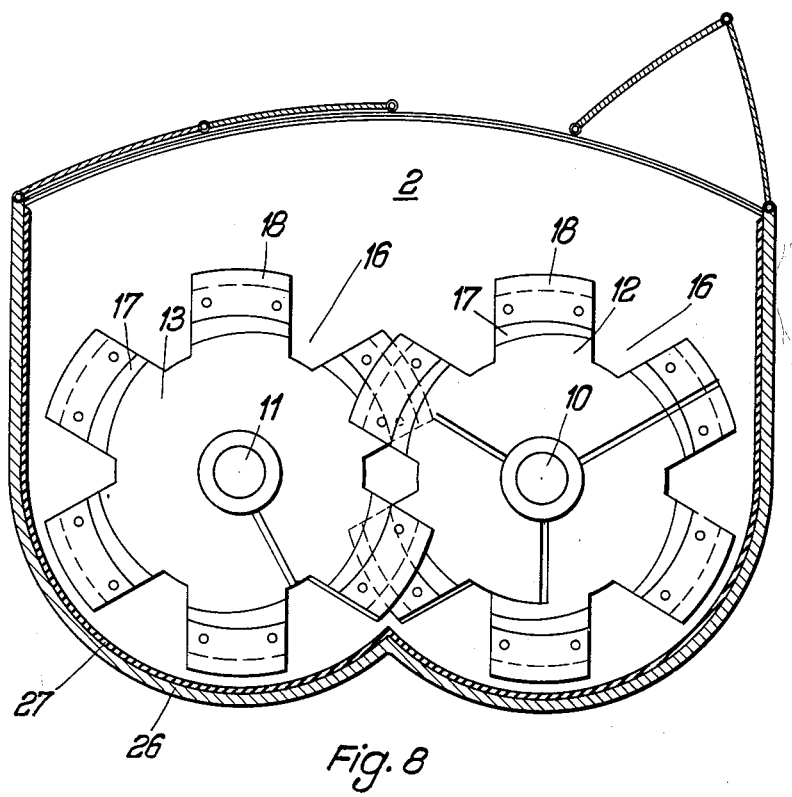
Figure 5:
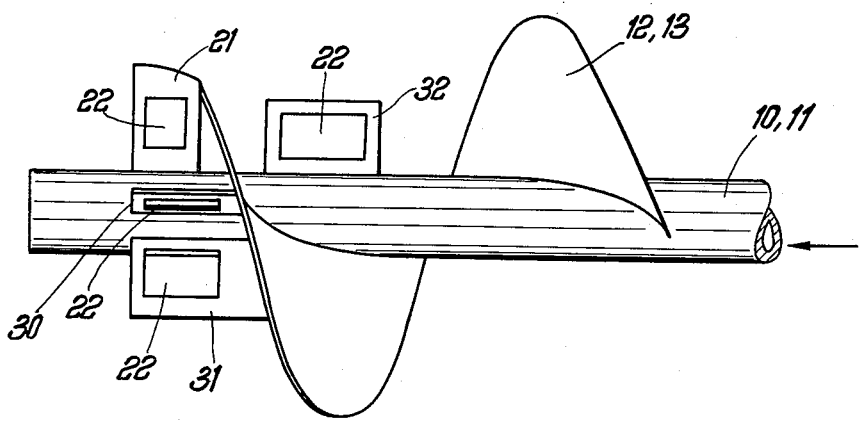
Figure 6:
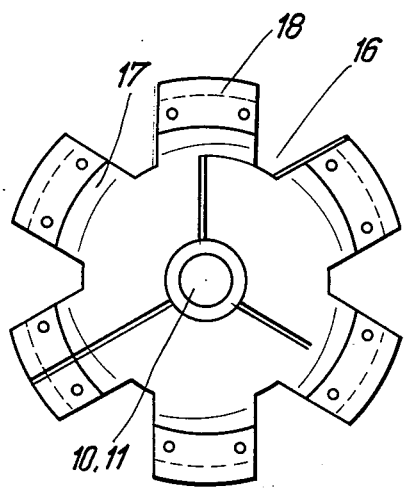
Figure 7:
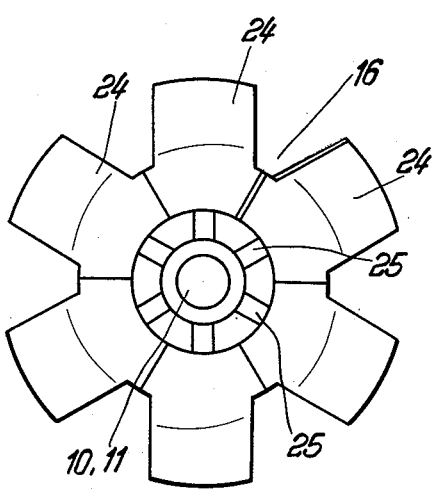

FIG. 1 shows a side view of a transport mixer according to the invention;
FIG. 2 shows a back view of this transport mixer;
FIG. 3 shows a view of the mix tank from above with the mixing screws in contra-rotation;
FIG. 4 shows the same view as FIG. 3 but with the mixing screws rotating in the same direction;
FIG. 5 shows a view of the end of a screw having the section which produces a lateral advance of the mix;
FIG. 6 shows a front view of a mixing screw;
FIG. 7 shows the front view of a mixing screw in a modified form.
FIG. 8 shows the mixing tank in cross section with the mixing screws therein.

In a transport mixer as shown in FIG. 1 the vehicle 1 carries a mixing tank 2 and a water tank 3. The vehicle has an auxiliary drive 4 coupled with a grear mechanism 5, the special functions of it being described later. The driven pinions 6 of the gear mechanism act on the gear wheels 7 mounted on the ends of the screw shafts 10, 11, the latter being mounted in the end walls 8, 9 of the mixing tank.

The mixing tank has at its rear end two outlet openings which can be closed in known manner by means of plates, flaps or the like and are not especially shown in the drawings. Preferably two outlet openings are provided so that the outlet of concrete can be controlled by selective operation of one or both flaps. Behind the outlet openings there is a chute 14, from which the concrete or the like is delivered direct to the transportation of building material from the centre portion of the vehicle.

As can be seen from FIGS. 2, 3 and 4 in particular the distance A between the two shafts 10 and 11 is smaller than the diameter D of the two mixing screws 12 and 13 mounted on the shafts 10 and 11. The amount of overlap of the two screws may come to about 10 to 15%.

During the mixing operation the two mixing elements are driven in contra-rotation. Because of this contrary rotation the transmission of dynamic forces to the transport vehicle is avoided to a great extent and a good mechanical mix achieved.

In order to make the contra-rotation of the two mixing elements 12 and 13 possible, their peripheries are provided with incisions or recesses 16, which are so arranged that the screws can always engage with each other at those points where they touch at their peripheries. Preferably six incisions or recesses of this kind are made in one helical mount as is shown in FIGS. 6 and 7. These recesses are only partly shown in FIGS. 3 and 4 and in FIG. 5 they are not at all shown.

The depth of the incisions 16 is so selected that there is sufficient free space between the bases of the cut-out portions which engage with each other.

The incisions 16 are preferably shaped in such a way that they taper towards the shaft 10, 11 in a way that there always remain rectangular screw sections 17 between them.

The arrangement of the cut-out portions is such that when viewed in projection there always remain narrow spaces between the surfaces passed by the individual screw sections in which narrow ribs of concrete could remain when the tank is emptied. In order to avoid this the screw sections 17 may, in addition, be twisted in the direction of the screw pitch in such a way that the projections of the outer edges of the screw sections overlap so that again a complete sweep over the bottom of the tank is obtained which is achievable by a screw. In this respect see especially FIG. 4.

Abrasion plates 18 are fixed to the ends of the screw sections 17 in the usual way and these plates are adjustable so as to compensate for the abrasion caused by the material. In order to make it possible to adjust the position of these plates the screw sections are suitably twisted in such a way that the profile on the periphery of the screw remains untwisted within the range of the attachment means. Thus the additional twisting of the screw section takes place substantially in the root portions of said sections.

The twisting of the blades causes at the same time an additional mixing effect which is due to the fact that because of the twisting two screws result each having a different pitch, i.e. the inner screw adjacent the shaft with a lesser pitch and the outer screw with a greater pitch.

If the shafts rotate in the directions indicated by the arrows in FIG. 4 the material will be forced into circulation through the mixer in a direction shown by said arrows and in this way a thorough mixing of the material is effected. In order to ensure a satisfactory transfer of the material from the feeding flow of one screw to the feed flow of the other screw it has been found suitable to have a section with a pitch greater than 45° up to 90° at the leading ends 19, 20 of the shafts in the direction of feed. This section causes a lateral feed of the material towards the adjacent screw. This section 21 can be formed by bending a part of the screw, but there may also be provided one or more blades 30, 31, 32. Suitably section 21 and also the additional blades should each be provided with an opening 22, by which excessive load of that section or of the blades will be avoided.

In order to make it possible to empty the mixer quickly, the direction of rotation of the screw conveying the material away from the discharge opening during the mixing operation can be reversed, so that after reversal has been effected both screws force the mix towards the discharge opening. When the two mixing elements rotate in the same direction they must be in a position in which their pitches coincide, as shown in FIG. 4, as only in this position it is possible to obtain friction-free rotation in the same direction without the two screws touching each other. To secure this rotation in same direction, means must be provided which do not allow of a reversal of the screws until there exists the above-mentioned alignment of the pitches. To effect this, special looking means can be provided within the gear mechanism, said means only allowing a reversal to take place when the two screws are in the position mentioned above. This problem can, however, also be solved through gearing means by providing a slow-running device within the gear mechanism, said means causing one of the screws to continue turning in the opposite direction to the other screw after the reversing mechanism has been actuated until alignment of the pitches of the two screws is attained.

In order to achieve additional discharge pressure a limited section of the end adjacent the discharge opening of the screw to be reversed can be given a lesser pitch. This increase of discharge pressure is particularly desirable because the laterally feeding section 21 of the other screw causes a considerable lateral advance towards the reversed screw 13 which thereby has to bring about an increased discharge output.

If only a slow rate of discharge is desired it may be suitable to allow the screws to continue to rotate in the opposite direction at the beginning of the discharge operation and then, after partial discharge to change over to rotation in the same direction.

The pitch of the screws is less than 45°, lying preferably between 10 and 30°.

If it is desirable to have the discharge level arranged at a greater height, the end of the mixing tank adjacent the driver's cabin may be tiltably mounted in the vehicle frame. A hydraulic lifting system known per se is provided at the opposite end by means of which the rear end of the mixing tank is lifted during discharge operation whereby a greater distance of the discharge edge 15 of the chute 14 from the ground will be obtained.

In order to make it possible to replace the worm screw on wear it can be constructed in separate screw sections each of them being detachably secured to the shaft. In an embodiment as shown in FIG. 7 the screw sections 24 have a short connecting piece, by means of which they are secured to the shaft. The screw sections in this case also, of course, carry abrasion plates as shown in FIG. 6.

The bottom of the mixing tank is formed of two arcuate troughs, in which the helical elements rotate.

In order to avoid wear of the tank bottom 26, said bottom may be provided in known manner with a lining of chilled cast iron. Such lining, however, involves the disadvantage of heavy weight. To overcome this drawback the invention proposes to provide the inner walls of the tank with a lining 27 of a highly wear-resistant plastic material, such as a material marketed by Farbwerke Bayer under the trade name "Vulkolan." Such lining may be applied either by means of an adhesive or by spray coating.

A special problem is the operation of the mixer during frosty weather. In order to avoid freezing of the material to be mixed it is an object of this invention to heat the mixer and that by passing hot gases through the hollow screw shafts (FIG. 5), which gases effect heating of the screws themselves. In this case the screw acts as a heat exchanging rib through which heat is transferred to the material to be mixed. Preferably, the heating gases are produced by an oil burner 28 mounted on the vehicle 1 and connected to the hollow screw shafts 10, 11 through conduits 29.

What we claim is:

1. In a transport mixer for concrete and other building material, a mixing trough having an open upper and a rear end, an outlet closing device at said rear end, two adjacent parallel shafts driven at the same speed and extending in a longitudinal direction inside said trough, a worm screw secured to each of said shafts, said worm screws having the same diameter and the threads thereof having over the major portion of their length the same pitch of less than 45° in the same direction, the distance between the axes of the two shafts being less than the total outer semidiameters of the two worm screws, each of said worm screws being provided at its periphery with incisions which taper towards the shaft, screw sections being left between said incisions, said worm screws engaging each other with said incisions when the said shafts are rotated in opposite directions.

2. Transport mixer according to claim 1, wherein said screw sections left between said incisions are twisted in the direction of their pitch and bring the projections of the outer edges into overlapping relationship.

3. Transport mixer according to claim 1, wherein the profiles at the periphery are untwisted over a length necessary for securing abrasion plates.

4. In a transport mixer according to claim 1 the worm screw which forces the mix away from the outlet opening and the direction of rotation of which is reversible.

5. Transport mixer according to claim 4, comprising means within the drive gear mechanism which allow a reversal of movement of the worm screw only when the pitch of the two worm screws coincides.

6. Transport mixer according to claim 4, comprising idle-running means within the gear mechanism, said means causing one of the worm screws to continue turning in the opposite direction to the other worm screw after the change-over mechanism has been actuated until the pitch of the worm screw coincides.

7. Transport mixer according to claim 1, in which the worm screws have a section at their front ends, when looking in the direction of feed of the mix, adjacent the tank wall, said sections having a pitch greater than 45° and causing a lateral feed of the mix towards the adjacent worm screw.

8. Transport mixer according to claim 1, in which blades are provided on the worm shaft at the end leading in feeding direction, said blades having a pitch greater than 45°, preferably 90°.

9. In a transport mixer according to claim 1, a reversible worm screw having at its end adjacent the discharge end a lesser pitch over a limited length.

10. In a transport mixer according to claim 1, an outlet opening provided at the discharge end in front of the end of each worm screw.

References Cited in the file of this patent

UNITED STATES PATENTS

| | | |
|---|---|---|
| 1,969,545 | Bollard | Aug. 7, 1934 |
| 1,982,817 | Leach et al. | Dec. 4, 1934 |
| 2,014,636 | Rosendahl | Sept. 17, 1935 |
| 2,155,422 | Korsmo et al. | Apr. 25, 1939 |
| 2,880,977 | Maxon | Apr. 7, 1959 |
| 2,890,865 | Costa et al. | June 16, 1959 |
| 2,893,537 | Krahn | July 7, 1959 |
| 2,917,284 | Christian | Dec. 15, 1959 |